Dec. 8, 1964  J. H. LOTT  3,159,925
HYDROSTATIC LEVELING DEVICE
Filed Jan. 11, 1962
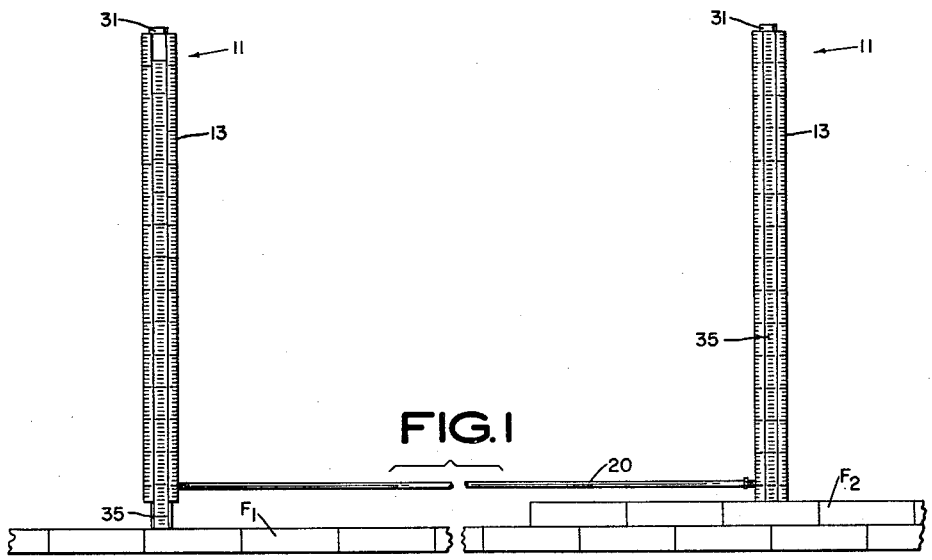
FIG.1
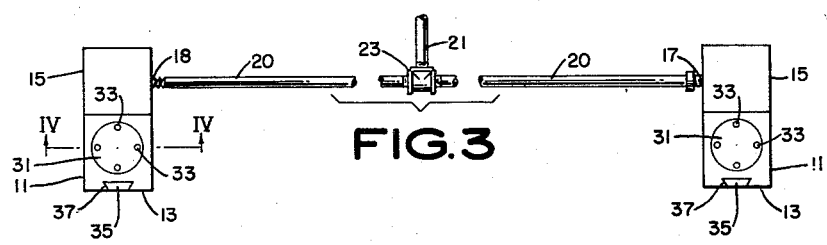
FIG.3
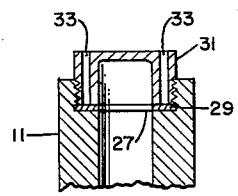 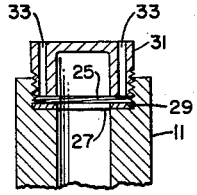
FIG.4  FIG.5
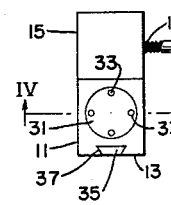
FIG.2
INVENTOR,
JAMES H. LOTT
BY Weatherford & Weatherford
Attys United States Patent Office 3,159,925
Patented Dec. 8, 1964

3,159,925
HYDROSTATIC LEVELING DEVICE
James H. Lott, Rte. 4, Henderson, Tenn.
Filed Jan. 11, 1962, Ser. No. 167,213
2 Claims. (Cl. 33—209)

This invention relates to certain new and useful improvements in leveling devices, particularly those which are adapted for use in connection with construction work such as the construction of buildings, houses, the installation of fixtures, of plumbing and the like.

There have previously been devised leveling devices for uses in various sorts of surface leveling which have largely proven inefficient from a commercial point of view because of their lack of flexibility and their lack of accuracy of measurement of the relative levels between the surfaces for which they are intended. As is well known, in the building of structures, such as houses and the like, often the grade level of the lot upon which the house is to be erected is such that the foundation will require different leveling, and the device of the present invention is extraordinarily useful in connection with such a problem, particularly at expanded distances as in connection with the opposite sides of such a foundation.

It further is well known that in the installation of fixtures, such as plumbing fixtures, in a building of the nature of a house, it is desirable to determine accurately the level of the respective surfaces in order to determine the level at which the plumbing fixtures may be introduced to and exit from the structure for proper operation.

The principal object of the present invention is to provide a new and novel leveling means of a simple construction which is adapted for use particularly in connection with building construction and may be utilized at extended distances.

A further object of the present invention is to provide such a leveling device which comprises a pair of transparent columns preferably provided with measuring scales and which are hollow for the reception of a level-indicating fluid such as water.

A further object of the invention is to provide such a device in which each of the leveling columns is provided with a sliding rule or scale member which is adapted for shift relative to the column in order to accurately afford measurement of differences in level between the respective said columns.

A further object of the invention is to provide such a leveling device comprising a pair of columns which are fluid filled and which are interconnected with a flow tube means providing for fluid flow between the column elements; and A further object of the invention is generally to improve the design, construction and efficiency of leveling devices.

The means by which the foregoing and other objects of the present invention are accomplished and the manner of their accomplishment will be readily understood from the following specification upon reference to the accompanying drawings, in which:

FIG. 1 is a vertical front view of a typical embodiment of the present device in use with parts broken away for purposes of illustration.

FIG. 2 is a top plan view of the device as seen in FIG. 1 on a slightly enlarged scale, with parts also broken away for purposes of illustration.

FIG. 3 is a view similar to FIG. 2 showing a variation in the device.

FIG. 4 is a fragmentary sectional view taken as on the line IV—IV of FIGS. 2 and 3 illustrating the cap of one of the columns in closed non-venting position, the opposite cap being similarly arranged; and FIG. 5 is a view similar to FIG. 4 illustrating the cap in venting position.

Referring now to the drawings in which the various parts are indicated by numerals, the leveling means of the present invention comprise at least a pair of columns 11, which are adapted to be disposed in upright vertical position, and which preferably are formed of transparent material in order to permit a view of the interior, and which, on at least one face, are preferably provided with scales 13 for the purpose of relative measurement.

Columns 11 are preferably of substantially square cross section and are hollow, being provided with an interior vertically extending chamber for the reception of a level indicating fluid such as water. At their lower ends each of the columns is provided with a base member 15, which is open and in communication with the interior of its associated column.

To each of base members 15 is fitted an intake member 17, 18, which are adapted to receive connection with an elongated flexible tubing 20 which may be of any desired length to accommodate the spaces and distances in which the device and means is intended to be used. Tubing 20 is preferably conveniently adapted to be connected to a suitable source of water supply, not shown. In the variation shown in FIG. 3 this connection may be through a pipe 21 through a T-joint 23. Upon communication of tubing 20 with the source of water supply, water or other suitable fluid may be supplied to at least one of the columns 11 through tubing 20, thence into the columns.

The upper end of each of columns 11 is provided with a vent cap means. Preferably each of the columns 11 is recessed at its upper end and the recess is internally threaded as at 25, the recesses being provided with a lower shoulder 27.

Seated upon lower shoulders 27 is an annular gasket 29, which is preferably of rubber or similar suitable resilient and flexible material. Gaskets 29 are provided for sealing the lower end of the openings of recesses 27 in the respective upper ends of columns 11. Threadedly engaged with the internal threading of each of the upper ends of columns 11 is a vented cap 31, which is provided with a plurality of vents 33 extending vertically through the cap.

When caps 31 are screwed tightly into the recesses so as to seat upon gaskets 29 on shoulders 27, the lower ends of vents 33 are cut off preventing the passage of air or atmospheric pressure through the vents. When, however, the caps are slightly unscrewed, as for example shown in FIG. 5, the vent lower ends are moved away from gasket 29 and come into communication with the interior of hollow columns 11 so as to provide a vent to atmosphere therethrough.

In addition, each of columns 11 is provided with a sliding extension member 35. Extension members 35 are respectively mounted in suitable channelways 37 formed in columns 11. Preferably each of extension members 35 is marked with suitable scale markings in order that upon shift thereof a relative measurement may be taken: Extensions 35 not only serve as a relative scale but selectively serve by slidable movement relative to columns 11 to provide an extension in length of a selected column such as is shown in FIG. 1 in order to maintain the proper measurement level for relative reading between the respective columns.

In the use of the device, tubing 20 may be connected to one of columns 11 and to the source of fluid supply. The connected column may then be filled with fluid and when so filled, tubing 20 disconnected from the supply and then connected with the other of columns 11. The latter connection establishes fluid communication between the columns and thus fluid level below full is established in the columns. In the alternate form of FIG. 3 communication to supply may be made through T-joint 23 with water pipe 21 and water is supplied to the interior of hollow columns 11 to a suitable level, preferably below capacity of the respective columns. In so doing it is desirable that each of caps 31 be loosened in order to free the lower ends of vents 33 away from gaskets 29 so that air within the column may readily escape. When a desired quantity of fluid has been introduced the water supply may be cut off and the caps may be closed down so as to close off vents 33.

The device may then be set up upon respective surfaces, such as the foundation surfaces F1 and F2, and the respective levels there established. In order so to do the respective caps 31 should be loosened from their seat upon gaskets 29 in order to permit atmospheric pressure to take effect upon the fluid within the interior of the respective columns 11.

When a level has been established at one of the columns, as for example the right hand column 11 of FIG. 1, thereafter extension member 35 of the other or left hand column should be extended until a level has been reached. In this manner the difference in level between the two surfaces can readily be read by the amount of extension of the extension member 35 beyond its related column.

I claim:

1. Hydrostatic leveling means comprising a pair of vertically disposed transparent columns, each said column having hollow interiors for the reception of indicating fluid therein, means at the lower end of each said column connecting said hollow interiors with a common supply of said fluid, each said column being axially recessed at its upper end, providing an upwardly open recess haivng a lower-most annular horizontal shoulder and communicating with the hollow interior of its related column, a gasket seated on each said shoulder, said recesses each being internaly threaded above said shoulders, cap means threadedly engaging within said recesses for vertical advancement and retraction relative to said shoulders and gaskets, each said cap means adjacent to its periphery including a plurality of vents extending vertically from top to bottom of said cap means, said vents being respectively in alinement with said gasket and shoulder and disposed in circumferentially spaced relation, said cap means when advanced into engagement with said gasket sealing the lower ends of said vents to prevent communication of the column hollow interior with atmosphere and blocking shift of indicating fluid in said column, retraction of said cap freeing said vents and establishing communication of column interior with atmosphere for relative shift of indicating fluid in said columns, each said column including a snugly contained, vertically shiftable extension member, shiftable from a selected said column to establish a visual relative measurement of the amount of difference in level between said columns.

2. Hydrostatic leveling means comprising a pair of vertically disposed transparent columns, each said column having hollow interiors for the reception of indicating fluid therein, means connecting said hollow interiors with a common supply of said fluid, each said column being axially recessed adjacent its upper end, providing an open recess having an annular shoulder and communicating with the hollow interior of its related column, a gasket seated on each said shoulder, said recesses each being internally threaded away from said shoulders, cap means threadedly engaging within said recesses for advancement and retraction relative to said shoulders and gaskets, each said cap means adjacent to its periphery including a plurality of vents extending from end to end of said cap means, said vents being respectively in alinement with said gasket and shoulder and disposed in circumferentially spaced relation, said cap means when advanced into engagement with said gasket sealing said vents to prevent communication of the column hollow interior with atmosphere and blocking shift of indicating fluid in said column, retraction of said cap freeing said vents and establishing communication of column interior with atmosphere for relative shift of indicating fluid in said columns, each said column including a snugly contained, vertically shiftable extension member, shiftable from a selected said column to establish a visual relative measurement of the amount of difference in level between said columns.

References Cited by the Examiner
UNITED STATES PATENTS

| | | | |
|---|---|---|---|
| 149,532 | 4/74 | Sherwin | 33—161 |
| 1,203,702 | 11/16 | Cashell | 33—209 |
| 2,438,758 | 3/48 | Leach | 33—206.5 |
| 2,566,102 | 8/51 | Waldo | 33—209 |
| 2,789,364 | 4/57 | Selleck | 33—209 |
| 2,971,264 | 2/61 | Cowan | 33—209 |

ISAAC LISANN, *Primary Examiner.*

ROBERT L. EVANS, *Examiner.*